United States Patent [11] 3,574,466

[72] Inventor Charles J. Peters
 Wayland, Mass.
[21] Appl. No. 721,385
[22] Filed Apr. 15, 1968
[45] Patented Apr. 13, 1971
[73] Assignee Sylvania Electric Products, Inc.
 Continuation-in-part of application Ser. No. 419,384, Dec. 18, 1964, now abandoned.

[54] ANGULAR MEASUREMENT APPARATUS
 5 Claims, 4 Drawing Figs.
[52] U.S. Cl. .................................................. 356/152, 343/16
[51] Int. Cl. ....................................................... G01b 11/26

[50] Field of Search........................................... 356/152; 343/16

[56] References Cited
UNITED STATES PATENTS
3,218,913  11/1965  Kaestner ...................... 356/152
3,399,590  9/1968  Johnson ....................... 356/152

Primary Examiner—Rodney D. Bennett, Jr.
Assistant Examiner—Joseph G. Baxter
Attorneys—Norman J. O'Malley, Elmer J. Nealon and David M. Keay ABSTRACT: Apparatus comprising stationary and rotating electromagnetic energy reflectors oriented to define a common plane wherein the reflectors cooperate with a remote energy source and sensors to provide an angular measure in the common plane between a reference line and a line of sight.

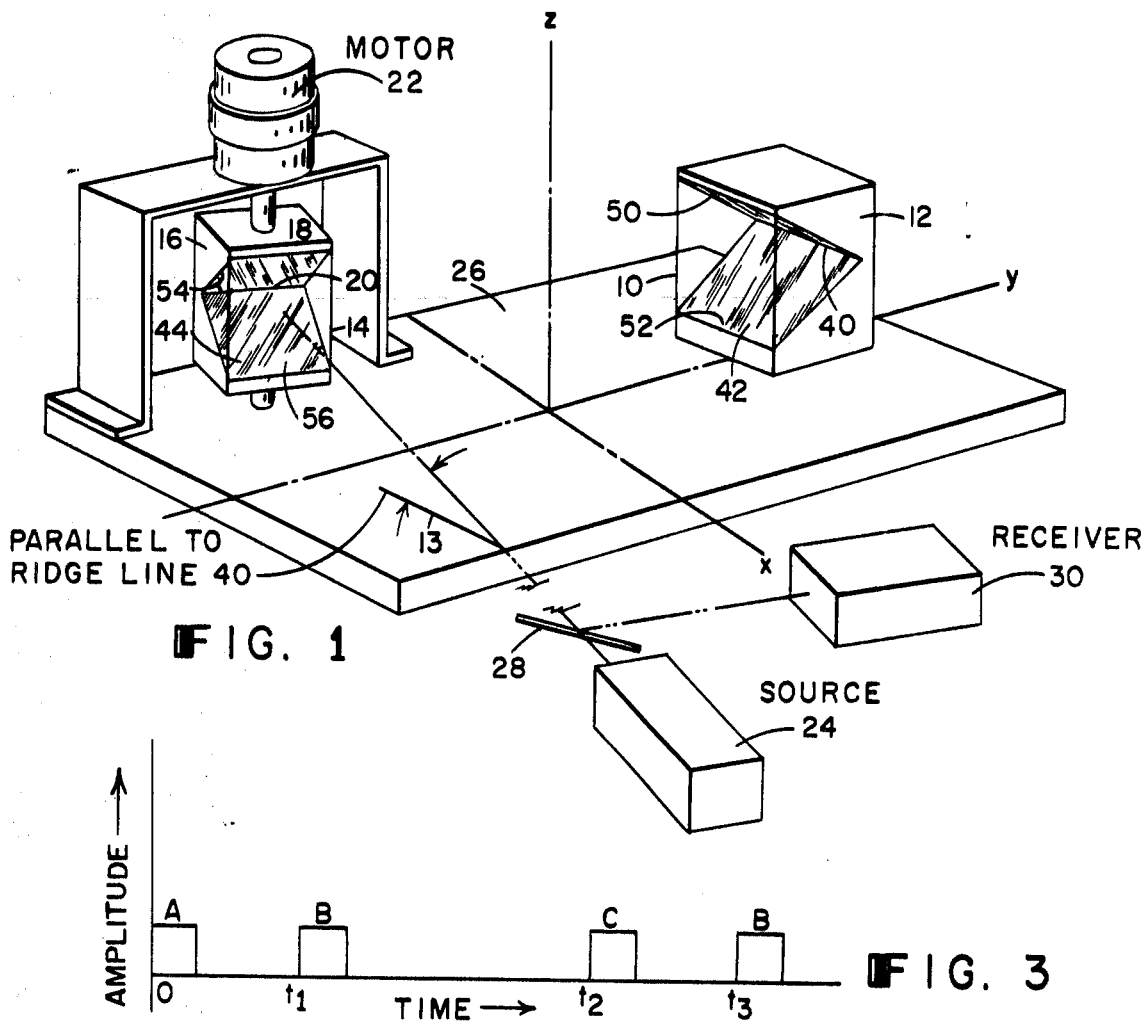
FIG. 1
FIG. 3
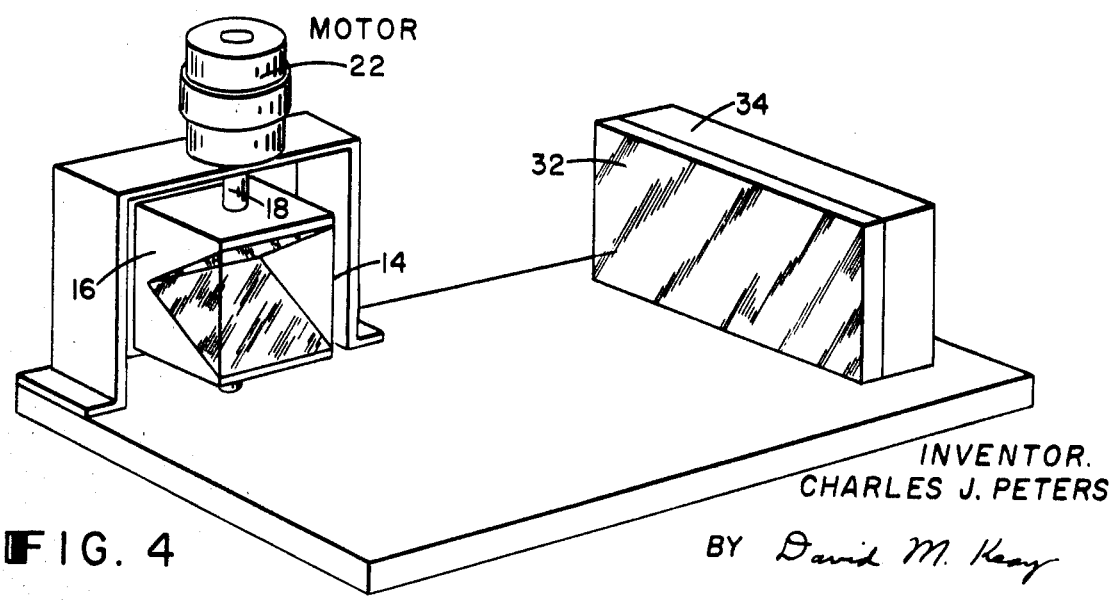
FIG. 4
INVENTOR.
CHARLES J. PETERS
BY David M. Keay
AGENT.

ANGULAR MEASUREMENT APPARATUS

CROSS-REFERENCE TO RELATED APPLICATION

This is a continuation-in-part of copending application Ser. No. 419,384, filed Dec. 18, 1964, now abandoned.

BACKGROUND OF THE INVENTION

This invention relates to electromagnetic position-sensing apparatus and more particularly to apparatus for measuring the angular disposition of a remote object such as a satellite or missile.

It is often necessary to know the exact attitude of a missile or satellite during flight. Various systems for measuring such attitude have heretofore been proposed; however, these systems are generally complex and often require considerable equipment mounted on the vehicle, thereby consuming valuable space and weight.

It is, therefore, an object of this invention to provide a simple and compact attitude sensor mounted in the vehicle to provide the necessary angular information.

It is a further object of the invention to provide a simple and reliable device for measuring angular disposition.

Another object of the invention is to provide an angular measurement in one plane which is independent of the angular position of other planes.

A still further object of the invention is to provide a remote measurement of missile attitude which is independent of the internal guidance system of the missile.

SUMMARY OF THE INVENTION

Briefly, the invention is concerned with apparatus comprising a stationary and a rotating electromagnetic energy reflector oriented such that the face of the reflectors are orthogonal to a common plane. The two reflectors cooperate with a remote energy source and sensors to provide an angular measure between a reference line and the line of sight. In essence, a beam of electromagnetic energy is transmitted from a remote source to the reflectors. When the rotating reflector passes through a first predetermined position typically orthogonal to the incident light, it reflects an energy pulse back to a remote receiver, and when the rotating reflector passes through a second predetermined position, typically orthogonal to the stationary reflector it cooperates with the stationary reflector to send a second energy pulse back to the receiver. The angular attitude in the plane of a body to which the reflectors are mounted can then be calculated from the elapsed time interval between the received energy pulses.

In one embodiment, the electromagnetic energy reflectors are 90° roof prisms which are arranged, according to the invention, to retroreflect pulses of light transmitted from a suitable light source. In another embodiment, radio reflectors, such as corner horns, can be employed in conjunction with a radio transmitter and receiver to provide the intended operation.

The foregoing, together with other objects, features, and advantages of the invention will be more fully understood from the following detailed description, taken in conjunction with the accompanying drawings, in which:

FIG. 1 is a diagrammatic pictorial view of one embodiment of the invention;

FIG. 3 is a waveform useful in illustrating the operation of the invention; and

FIG. 4 is a diagrammatic pictorial view of another embodiment of the invention.

Figure 2:
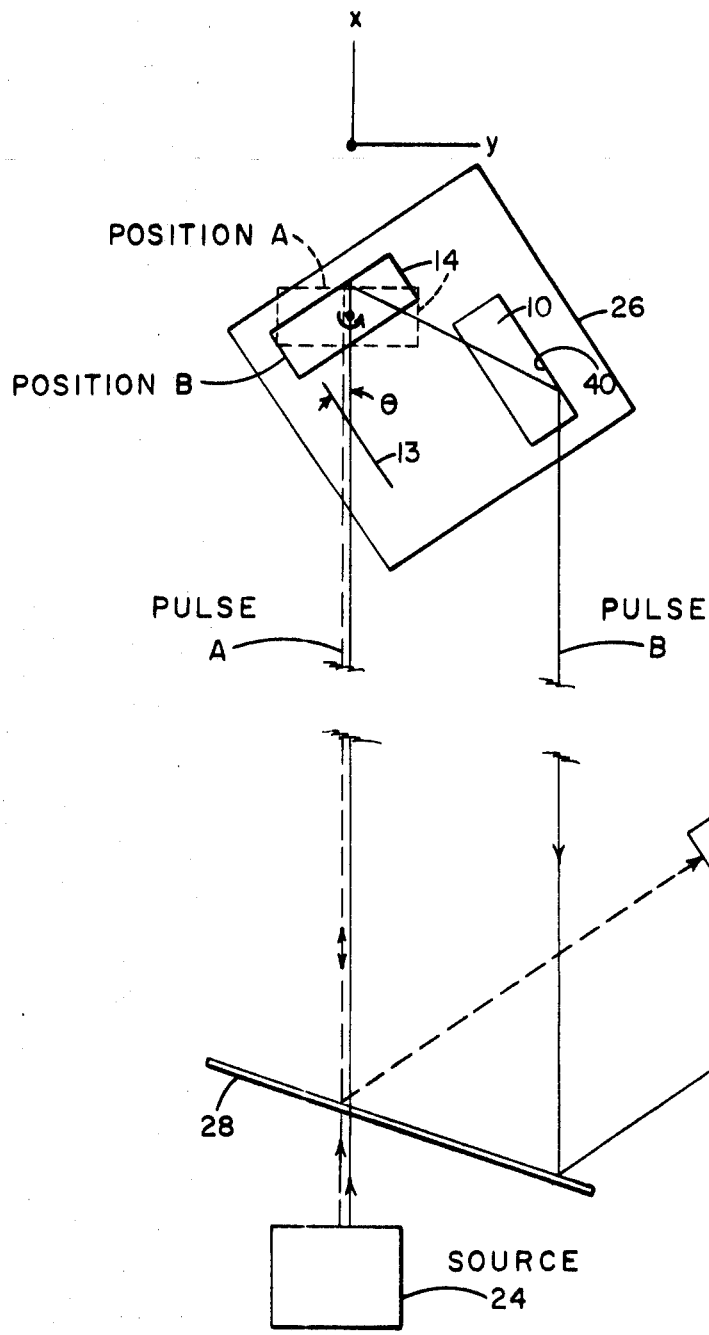
FIG. 2 is a representation in plane view of the embodiment of FIG. 1.

Referring to FIG. 1, there is shown a stationary 90° roof prism 10, including a ridge line 40, mirrored surfaces 50 and 52 and a face 42, mounted in support block 12 having a V-shaped groove therein to accommodate prism 10. Alternatively, a plane mirror could be used in place of the prism, as will be discussed hereinafter. A second 90° roof prism 14, including a ridge line 20, mirrored surfaces 54 and 56 and a face 44, is similarly mounted in a support block 16 and is rotatable about an axis 18 which is perpendicular to a common plane, $xy$, and parallel to the $z$ axis. The ridge line is the line formed by the intersection of the two reflecting surfaces of the prism. Rotation is accomplished, for example, by a motor 22. The pair of prisms are disposed with their ridge lines in a common plane parallel to the $xy$ plane and are mounted on a plate 26, the attitude of which is to be determined in the common plane. A light source 24, remote from body 26, is provided to illuminate the prisms and can be, for example, a spotlight or a CW laser. Light reflected back by the prisms to the source is directed by a collecting mirror 28 to a receiver 30 which typically includes any one of various conventional photosensitive devices for converting light energy to electrical energy and a time-measuring device.

To afford a better understanding of the operation of the present invention, a plane view of the preferred embodiment is shown in FIG. 2. A light beam from source 24 is directed toward rotatable prism 14 through a hole provided in mirror 28. When the ridge line of the rotating prism 14 is perpendicular to the incident light beam 25 indicated by the prism 14 in position A, a pulse of incident light A is reflected back toward the source where it is intercepted by mirror 28 and directed to receiver 30. Since the received light beam is larger in diameter than the transmitted beam, a major portion of the received beam is directed to the receiver by mirror 28. When the ridge line of the rotating prism 14 is perpendicular to the ridge line of stationary prism 12, as shown when prism 14 is in position B, the incident light is reflected between the two prisms and directed as pulse B to receiver 30 via collecting mirror 28. A pair of light pulses are, therefore, received by the receiver 30 once every revolution of the rotating prism. As stated hereinabove, a return pulse is generated when the rotating prism 14 is in either one of two predetermined positions, typically when its ridge line is either perpendicular to the incident light or perpendicular to the ridge line of stationary prism 12.

The time interval between the received pulses is a measure of the angle, $\theta$, defined by the incident light path and line 13 which is parallel to the ridge line 40 of the stationary prism 10. The time interval can be measured by any well-known means, for example, an oscilloscope. The output pulses observed on the oscilloscope which are representative of the light pulses received from the prisms are shown in FIG. 3. Pulse A occurs at time zero and is representative of the light returned to the source when the ridge line of the rotating prism 14 is perpendicular to the line of sight. Pulse B occurs at time $t_1$ and is representative of the light returned to the source when the ridge line of the rotating prism 14 is perpendicular to the ridge line 40 of the stationary prism 10. Pulses A and B reoccur at times $t_2$ and $t_3$, respectively, when the rotating prism is again in the operative positions to retroreflect the light. The angular attitude ($\theta$) between the incident light beam and ridge line 40 of prism 10 can be calculated according to the equation $$\theta = \frac{t_1}{t_2} 360°$$

The angle, $\theta$, can thus be computed either by directly measuring $t_1$ and $t_2$ or their ratio or by measuring $t_1$, only, if the angular speed of rotating prism is known precisely. Note that $[360°/t_2]$ is equivalent to the angular speed of the rotating mirror.

It will be appreciated that the incident light beam must be within a predetermined angular sector in order to provide requisite operation. At incident angles outside this sector, the light is not suitably reflected between the optical components to provide a retroreflected signal. With small optical elements, the apparatus is operable over a sector of approximately 90°. The angular coverage can be extended by employing larger optical elements or by using additional reflective elements. The utility of the invention is not significantly hampered by the above limitation, however, since in practice the attitude of a missile or satellite is usually known within the predetermined angular sector, and, therefore, the incident light beam will be within the operative region.

An alternative embodiment of the invention is illustrated in FIG. 4, which differs from the structure of FIG. 1 by the substitution of a plane mirror 32 for the stationary prism 10. Mirror 32 is mounted on a suitable support plate 34 and is disposed with its reflecting surface perpendicular to mounting plate 26 and parallel to axis 18 of prism 14. The use of mirror 32 requires more critical mechanical alignment of the optical components than the embodiment of FIG. 1 since the mirror must be parallel to the rotational axis of prism 14, whereas in the two-prism embodiment, the ridge lines must only be aligned to lie in a common plane. Once properly aligned, however, the operation of the two embodiments is the same.

To completely define the attitude of a missile or satellite, it is, of course, necessary to have angular data for the three principal axes by which the position of the vehicle is located. To accomplish this, three sensors of the type herein described can be mounted on a vehicle with their rotational axes mutually perpendicular, and when illuminated by suitably oriented incident light beams, can furnish information defining the angular attitudes, roll, pitch and yaw of the vehicle.

As an alternative construction, the invention could operate with radio waves rather than with light. Radio reflectors, such as corner horns, could be used in place of the prisms, and a radio transmitter and receiver used in place of the light source and receiver. To keep the reflector size to practical dimensions, the operating wavelength should be in the microwave region, although longer wavelengths could also be utilized if the size of the components could be tolerated.

From the foregoing, it is evident that simple and effective angle-measuring apparatus has been provided which is especially useful in determining the angular disposition of a missile or satellite during flight. The invention is not to be limited by what has been particularly shown and described, except to the extent indicated in the appended claims.

I claim:

1. Apparatus for angular measurement comprising:
    first and second electromagnetic energy reflectors each having a face disposed orthogonal to a common plane;
    means supporting said first reflector for rotation about an axis orthogonal to said common plane;
    means for transmitting a beam of electromagnetic energy to said first reflector, said first reflector being operative to retroreflect an electromagnetic energy pulse when said first reflector is rotated through a first predetermined position, and said first and second reflectors being cooperatively positioned to retroreflect an electromagnetic energy pulse when said first reflector is rotated through a second predetermined position; and
    means for receiving said retroreflected pulses, said means for receiving including means for measuring the time interval between the retroreflected pulse generated when said rotatable reflector is passing through said first predetermined position and the retroreflected pulse generated when said rotatable reflector is passing through said second predetermined position.

2. Apparatus for angular measurement according to claim 1 wherein said means for receiving further includes means for measuring the time interval between successive retroreflected pulses generated when said rotatable reflector passes through said first predetermined position.

3. Apparatus for angular measurement according to claim 1 wherein said first and second electromagnetic energy reflectors are optical reflecting elements and wherein said means for transmitting a beam of electromagnetic energy includes a light source.

4. Apparatus for angular measurement according to claim 3 wherein: said first and second optical reflecting elements are roof prisms, each having a ridge line disposed in a common plane and wherein said first predetermined position is the position in which said transmitted beam is orthogonal to the ridge line of said first reflector and said second predetermined position is the position in which the ridge line of said first reflector is orthogonal to the ridge line of said second reflector.

5. Apparatus for angular measurement according to claim 3 wherein said first reflector is a roof prism and said second reflector is a plane mirror.